(12) United States Patent  (10) Patent No.: US 7,798,685 B2
Edmond et al.  (45) Date of Patent: Sep. 21, 2010

(54) MOTORCYCLE SHOCK LIGHT

(76) Inventors: Matthew P. Edmond, 109 Springhurst Dr., Columbia, SC (US) 29223; Raquel L. Edmond, 109 Springhurst Dr., Columbia, SC (US) 29223

(\*) Notice: Subject to any disclaimer, the term of this patent is extended or adjusted under 35 U.S.C. 154(b) by 297 days.

(21) Appl. No.: 12/022,908

(22) Filed: Jan. 30, 2008

(65) Prior Publication Data

US 2008/0180962 A1  Jul. 31, 2008

Related U.S. Application Data

(60) Provisional application No. 60/898,389, filed on Jan. 30, 2007.

(51) Int. Cl.
*F21V 33/00* (2006.01)

(52) U.S. Cl. ............ 362/473; 362/217.12; 362/217.14; 362/249.01; 362/249.02

(58) Field of Classification Search ............. 362/217.1, 362/217.14, 217.16, 220, 217.02, 217.17, 362/217.01, 249.01, 249.02, 249.07, 249.08, 362/221, 224, 486, 457, 236, 240, 244, 249.12
See application file for complete search history.

(56) References Cited

U.S. PATENT DOCUMENTS 4,392,927 A * 7/1983 Fabian et al. ................. 205/532
5,181,774 A * 1/1993 Lane ........................... 362/549
5,688,042 A * 11/1997 Madadi et al. ............... 362/240
7,011,427 B1 * 3/2006 Baez ........................... 362/191
7,131,755 B1 * 11/2006 Feng ............................ 362/473
2002/0093825 A1 * 7/2002 Bailey ......................... 362/473
2003/0007347 A1 * 1/2003 Huang et al. ................. 362/205

\* cited by examiner

*Primary Examiner*—Jong-Suk (James) Lee
*Assistant Examiner*—Robert J May
(74) *Attorney, Agent, or Firm*—Calhoun Thomas, III; Samuel Alexander Long, Jr.

(57) ABSTRACT

The invention is a motorcycle shock mounted illumination device. The invention features a base mount with metal strap for primary attachment to a motorcycle shock, an angled pair of light strips created from circuit boards and LEDs and attached to the base mount, and a tubular housing that also attaches to the base mount. The tubular housing is translucent and encloses the light strips. The generally rearward facing light strip is designed to flash in red when the motorcycle brakes are applied and the generally sideward facing light strip is designed to be generally on all the time in yellow or amber except when the motorcycle brakes are applied in which case the LEDs of the side facing strip turn off and on in a grouped sequence.

9 Claims, 5 Drawing Sheets

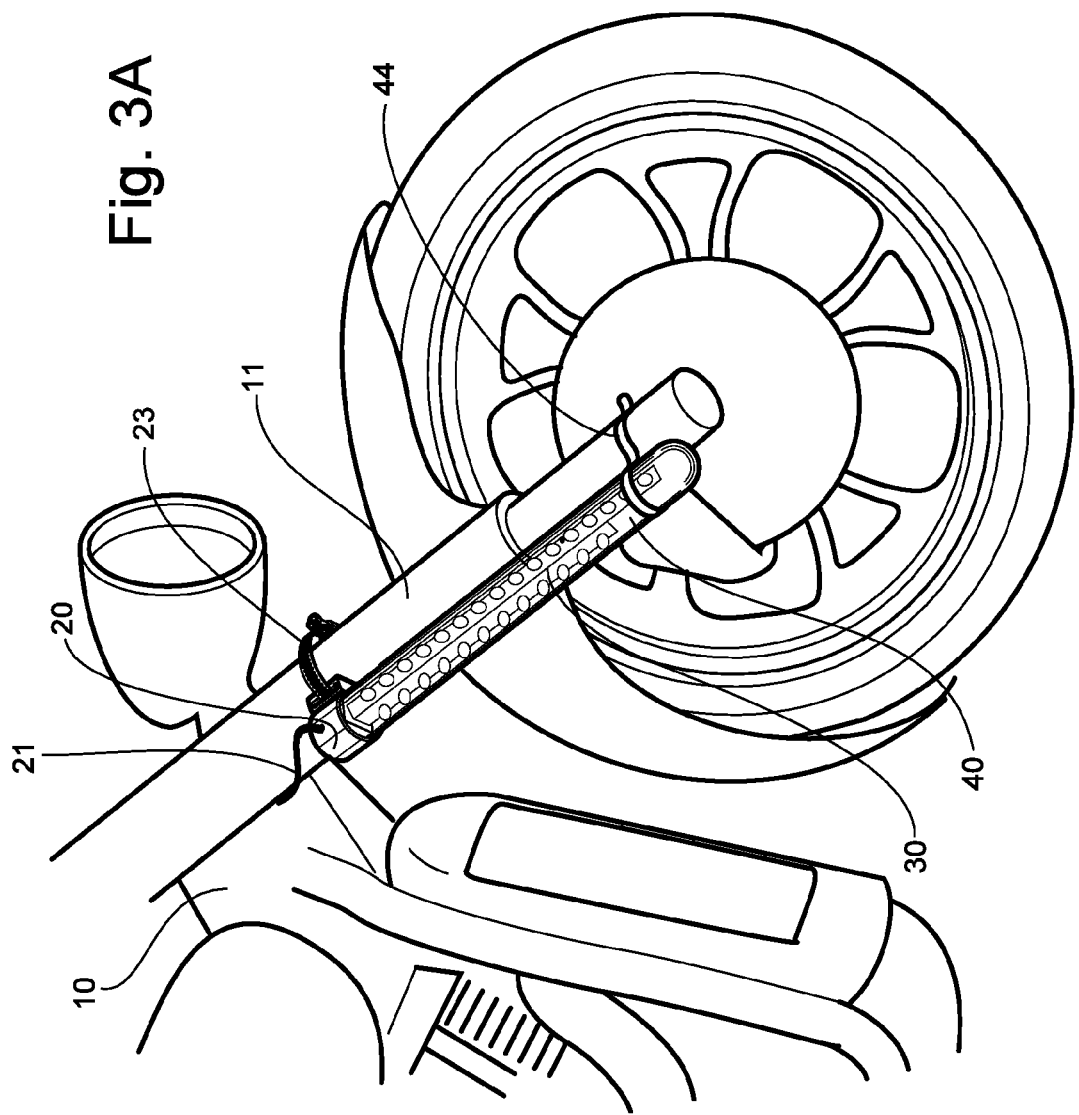

MOTORCYCLE SHOCK LIGHT

RELATED APPLICATIONS

This application claims the benefit of the prior filed U.S. Provisional Application having Ser. No. 60/898,389.

FEDERALLY SPONSORED RESEARCH OR DEVELOPMENT

Not applicable.

REFERENCED OR INCORPORATED MATERIAL

Not applicable.

SUMMARY OF THE INVENTION

The invention is an illumination device for motorcycles and similar personal transportation vehicles. The illumination device is designed to provide illumination and opportunity for visual recognition to operators of other vehicles, especially at night and in conditions and areas of poor visibility. The illumination device attaches to the front shocks of the motorcycle. They thus form a set with one each, respectively, on the left side of the bike and on the right side of the bike.

The device is designed to provide illumination for both safety purposes and aesthetic purposes. It also may be used as an indicator for special privileged emergency responder vehicles such as police motorcycles.

The device provides sets of lights that provide illumination in two relative directions. First, one set of lights on the device is designed to shine outward in roughly the direction perpendicular to the motorcycle. Shining in this direction alerts traffic traveling perpendicular to the motorcycle of the motorcycle's presence. In the preferred embodiment of the invention these lights may be colored yellow or amber. When the motorcycle's headlight is turned on, these lights shining outward to the side will also be turned on and will stay on in a steady fashion until braking activity of the motorcycle occurs. When the motorcycle brakes are applied these lights facing outward will temporarily stop their constant illumination and they will begin to illuminate in a grouped sequence fashion. For instance, in the preferred embodiment, a group of lights at the top of the device will turn on and then turn off, followed immediately by the next sequential grouping of lights turning on and off, and then the next, with each group of lights turning on and then off in sequence until all side facing lights have cycled through the on and off illumination. If braking continues once the first the sequence has completed itself, then the sequence will repeat itself for as long as the motorcycle is braking.

Second, another set of lights on the device is designed to shine in a generally rearward direction when the motorcycle is braking. This additional illumination further serves to alerts traffic traveling in the same direction as the motorcycle to the motorcycle's presence and provides an additional indication of the motorcycle braking activity. In the preferred embodiment of the invention these lights are typically red in color. When the motorcycle brakes are applied, these red lights become illuminated. They are not illuminated when the motorcycle is not braking.

The device can be characterized into three basic components including the light strips, the tubular housing, and the base mount. Importantly, in the preferred embodiment of the invention the light strips are Light Emitting Diode (LEDs) lights with a plurality of individual LEDs connected via a circuit board. As an indication of the commencement of braking maneuvers, the LEDs may be programmed to flash or respond in linear succession as the brakes are applied.

The tubular housing is translucent such that it allows light to shine through and may be easily removed and reattached by the motorcyclist. This tubular housing may be clear or one of many colors or multicolored. This translucent tubular housing thus allows the motorcyclist to change the appearance or color of the housing as desired for a particular application. The most typical choice may be clear, however various government agencies may use red or amber and police may want to use a blue colored tubular housing with differing on and off controls, for instance. Additionally, the LEDs may be different colors. Typically, the generally rear facing LEDs are red while the side facing LEDs are yellow or amber. With a clear tubular housing, these colors stand out while they become somewhat muted with colored housing.

The translucent tubular housing covers the entirety of the LED light strips and attaches to the base mount via a threaded connection or other standard means of connection. The LED light strips are removably attached to the base mount and the individual LEDs are removably attached to the circuit boards. The base mount also provides a means through which the current for the wiring of the light strips passes and is shielded as such current is obtained from the power supply of the motorcycle.

By means of its base mount, the invention is designed to attach to a wide variety of motorcycle shocks. This variability is accomplished via an adjustable attachment strap. The strap is an adjustable band that fits around the shock of the motorcycle and a portion of the base mount. It may be tightened or loosened as necessary to fit different diameters and shapes of shocks.

In a further embodiment of the invention, the base mount also has a removable top cap that is attached to the top portion of the base mount. This top cap may be designed with a motorcycle logo or other logo of choice for the motorcycle user.

In addition to the tightened strap holding the base mount securely to one of the front shocks of the motorcycle and this then controlling movement of the device in all directions, there is also a clip that further secures the tubular housing. This clip secures the tubular housing by controlling movement in directions perpendicular to the axis of the motorcycle shock.

BRIEF DESCRIPTION OF THE SEVERAL VIEWS OF THE DRAWINGS

FIG. 3A is a perspective view of the invention in place on a motorcycle.

DETAILED DESCRIPTION OF THE INVENTION

Figure 1A:
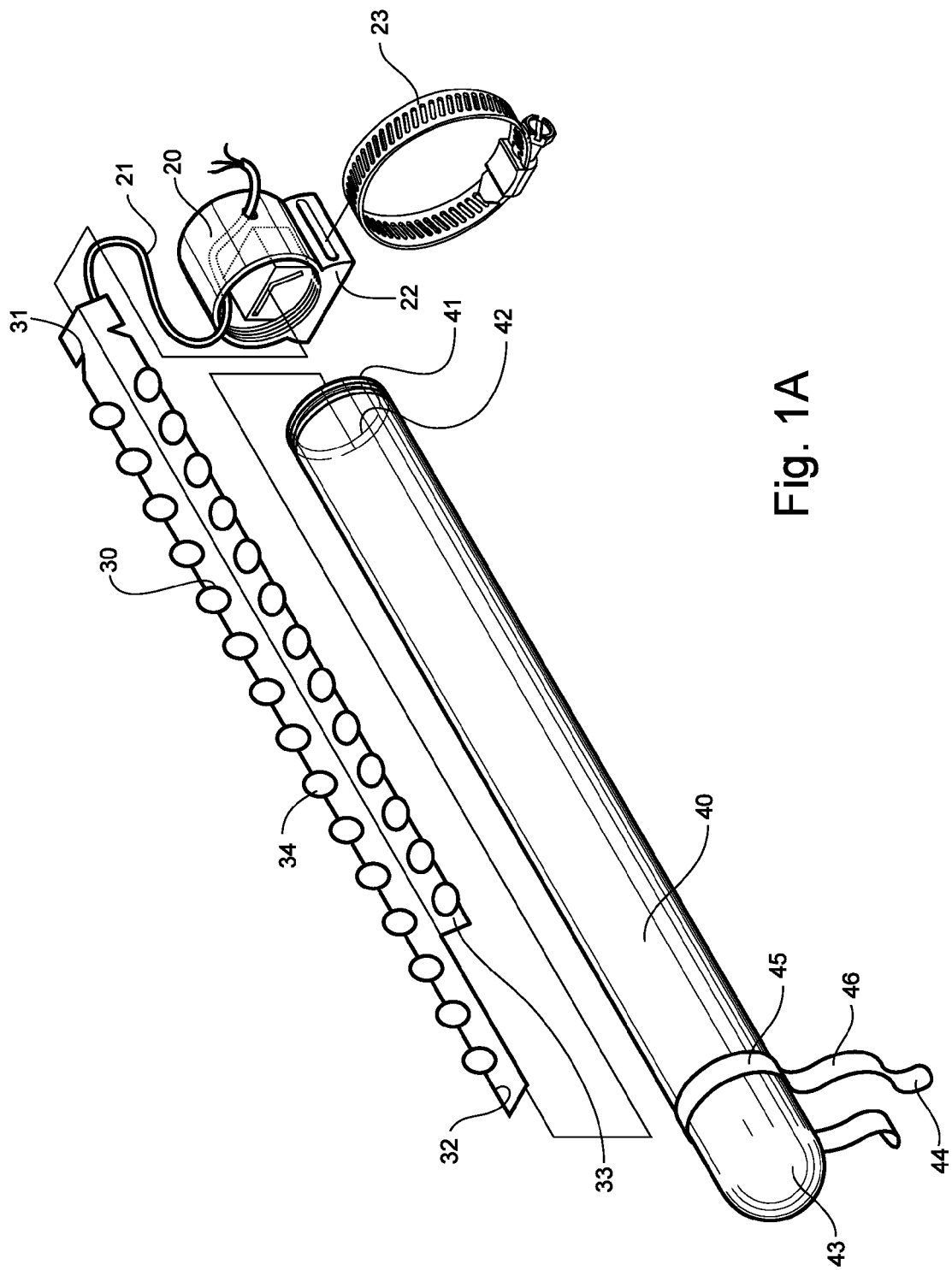
FIG. 1A is an exploded view of the invention.
Figure 1B:
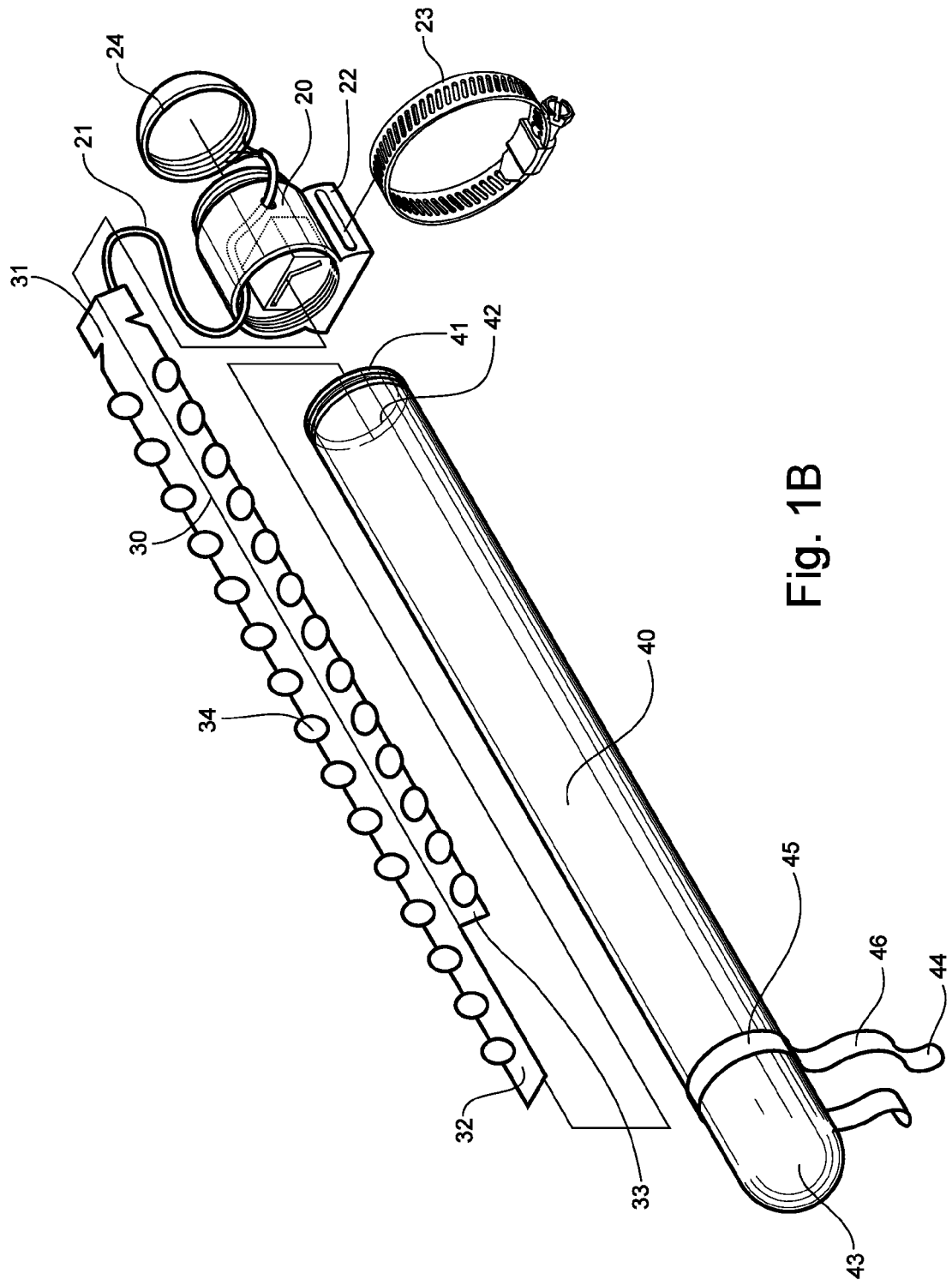
FIG. 1B is an exploded view of the invention showing the alternate embodiment with the end cap.
Figure 2:
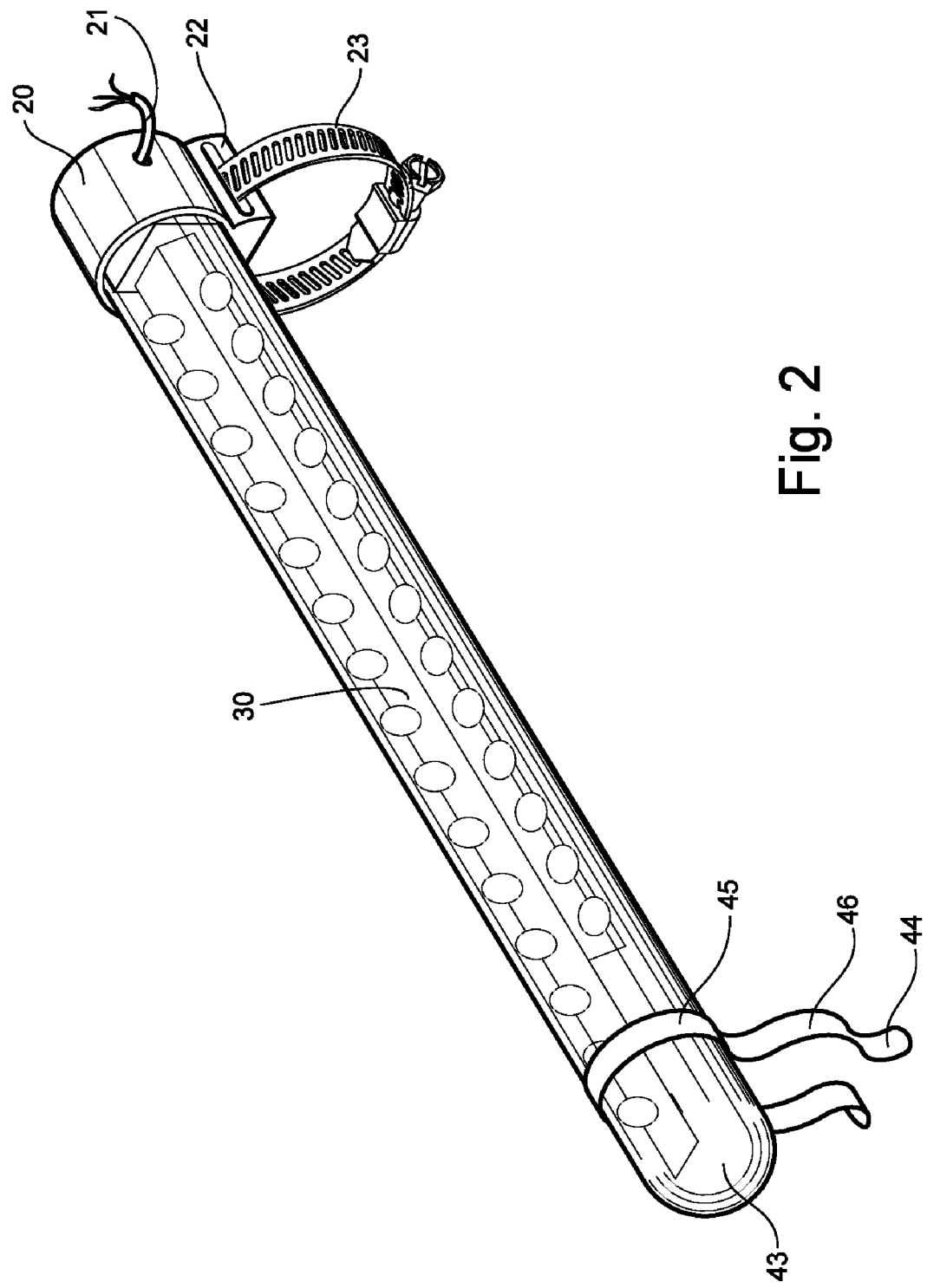
FIG. 2 is perspective view of the invention.
Figure 3B:
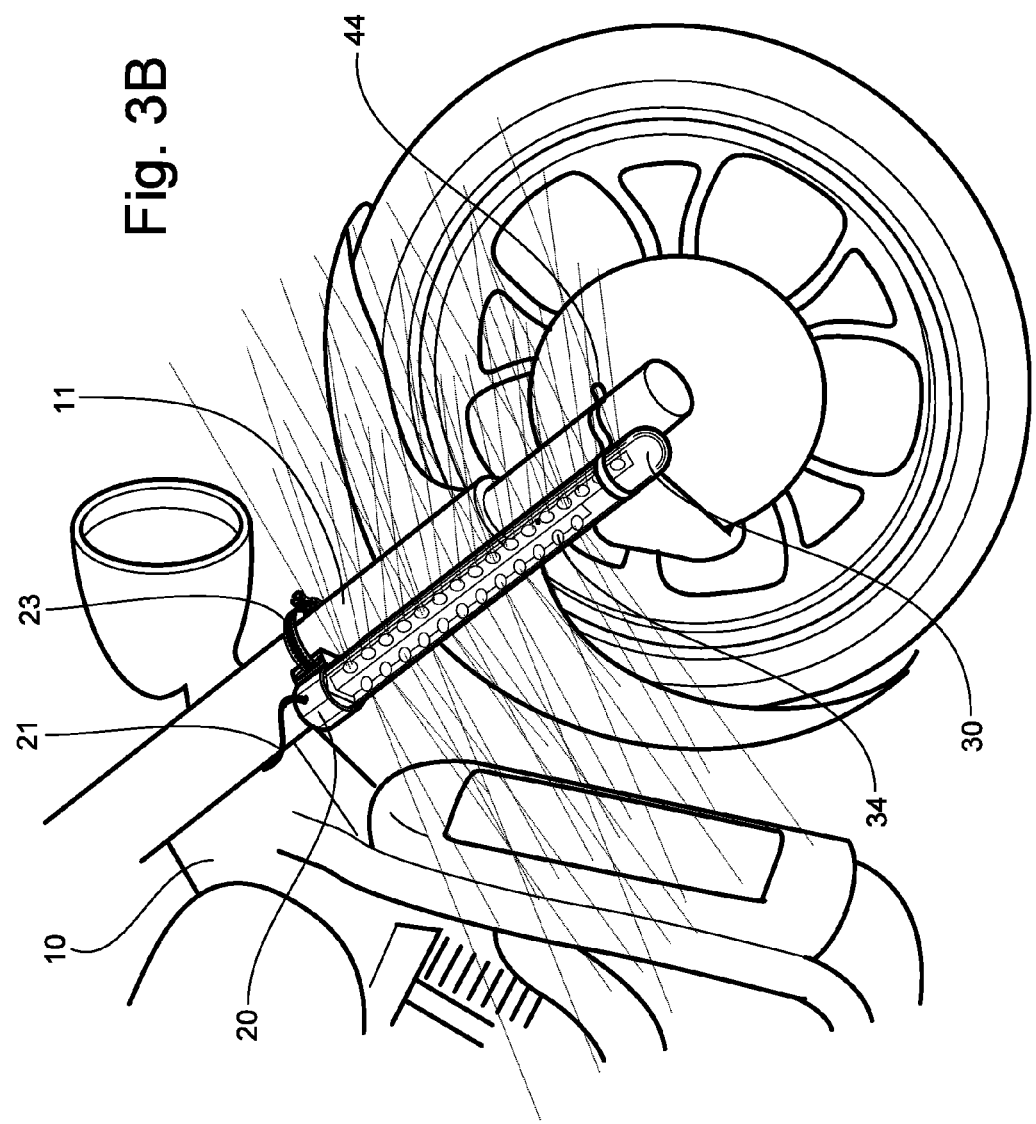
FIG. 3B is a perspective view of the invention in place on a motorcycle and highlighting the rays of light emanating from the LEDs.

It is to be understood by a person having ordinary skill in the art that the present discussion is a description of exemplary embodiments only, and is not intended as limiting the broader aspects of the present invention. The following embodiment example is provided to further illustrate the invention and is not to be construed to unduly limit the scope of the invention.

The invention is an illumination device for motorcycles (10) and similar personal transportation vehicles. The device comprises: jointed light strips (30), a cylindrical shaped tubular housing (40), and a base mount (20).

The base mount (20) supports both the primary point of attachment to the motorcycle and the connections for the tubular housing and the light strip. The base mount also provides a shielded conduit through which the wiring (21) of the light strips (30) passes while traveling to the electrical power source of the motorcycle (10). The base mount (20) is generally cylindrical in shape, except for the portion to be positioned adjacent to the motorcycle shock (22). In the present embodiment, the housing portion of the base mount (20) is made of a rigid material such as molded plastic, though other materials such as lightweight metal could also work. The base mount (20) is removably attached to the tubular housing (40) and to the light strip (30).

The base mount (20) attaches to the motorcycle (10) through an adjustable strap (23) type connection. This strap (23) is fixedly attached to the base mount (20) and removablely attached to the motorcycle (10). The strap (23) slides around a shock- absorbing front fork (11) of a motorcycle (10) and can be tightened and fitted at installation. The strap (23) may be adjusted to fit many different sizes of motorcycle shocks.

The base mount (20) also has a removable rounded top cap (24). In the preferred embodiment of the invention, this top cap (24) typically will use a threaded connection (41) to attach to the base mount (20); however, other standard means of connection may also be made part of the device. This top cap (24) may be designed with a motorcycle logo or other logo of choice for the motorcycle user.

The light strip (30) is removably attached to the base mount (20). The light strip (30) further comprises a circuit board (31) having a roughly angular "L" shape, a plurality of LEDs (34), and a connection wire (21) or other means of transmitting needed electric current. The L shape circuit board (31) further comprises two portions, a side portion (32) and a rear portion (33). The rear portion (33) points in a direction behind the motorcycle (10) while the side portion (32) points in a direction perpendicular to and away from the motorcycle (10). In the preferred embodiment of the invention, the angle between the side (32) and rear (33) portions is roughly greater than 90 degrees. Further, the side portion (32) of the circuit board and the associated LED lights (34) mounted thereon is slightly longer than the rear portion (33). Both the rear portion (33) and the side portion (32) may be programmed so that their respective attached LEDs (34) flash or blink intermittently or in succession as the brakes are applied.

In the present embodiment, the light strips (30) are programmed so that the rear lights (33) flash on when the motorcycle brakes are applied and they turn off when the braking action ends. These generally rearward facing LED lights are preferably red in color. In the preferred embodiment of the invention, they provide additional visual indications of braking activity to other drivers behind or to either of the rear sides of the motorcycle.

When the motorcycle's headlight is turned on, the side facing (32) lights are also turned on so that they will constantly shine out to the side. These lights are preferably yellow or amber and they will stay on in a constant fashion until braking activity of the motorcycle occurs. When the motorcycle brakes are applied these lights facing outward will temporarily stop their constant illumination and they will begin to illuminate in a grouped sequence fashion. For instance, in the preferred embodiment, a group of lights at the top of the device will turn on and then turn off, followed immediately by the next sequential grouping of lights turning on and off, and then the next, with each group of lights turning on and then off in sequence until all side facing lights have cycled through the on and off illumination. If braking ends before the sequence completes, the sequence will continue until the bottom group is briefly illuminated and then the complete side portion of lights will resume constant illumination. If the motorcycle braking continues after the first the sequence has completed itself, then the complete sequence will repeat itself for as long as the motorcycle is braking The tubular housing (40) portion of the invention is long and cylindrical and encloses the light strips (30). The tubular housing (40) is removably attached to the base (20) via a threaded connection (41) or other standard means of connection. The tubular housing (40) may be made in a variety of colors and is preferably made from a translucent plastic. This plastic is formed in a cylindrical shape that generally approximates a large test tube. The tubular housing has two ends, respectively one open end (42) and one closed end (43). When installed as part of the invention on a shock (11) of a motorcycle (10), the preferred embodiment of the invention positions the closed end (43) of the tubular housing (40) nearest the ground; however, the invention can be oriented in other directions as well. In the preferred embodiment of the invention, the open end (42) of the tubular housing has outwardly oriented threads molded thereon which mesh with inwardly molded threads of the base mount. The closed end (43) is preferably of a rounded shape that matches the rounded opposite and removable end cap of the base mount (20).

The tubular housing (40) preferably also has a removable clip (44) installed nearer to the closed end (43) that further secures the tubular housing (40) and keeps the lower closed end from moving in the direction perpendicular to the axis of the motorcycle's shock (11). When the invention is in use, this clip (44) helps to prevent the tubular housing (40) from twisting the base mount (20) portion which is secured by the adjustable strap (23). This removable clip (44) has two portions that are attached to each other; a loop portion (45) and a partial loop portion (46) that appears as a round clip with two arms. The loop portion (45) of the clip is tightly fixed around the tube (40) and the round clip portion uses a spring force between the two arm portions to maintain its removable fixation to the motorcycle shock. When being installed, the arms are spread open and placed around the shock. When released from the open position, the spring force keeps the two arms of the spring clip firm in place around the shock of the motorcycle. It is also possible to orient this removable clip (44) in such a fashion as to have the loop portion (45) around the motorcycle shock (11) and the rounded spring clip portion (46) around the tubular housing (40).

What is claimed is:

1. A motorcycle shock light comprising:
    a base mount for attaching the shock light to the shock of a motorcycle, wherein the base mount is made of plastic and further comprises an open end for accepting the tubular housing, a closed end, a wire opening, a slotted opening, and an adjustable metal strap for attaching to the shock of a motorcycle, said adjustable metal strap of the base mount fitting through the slotted opening of the base mount;
    a jointed light strip removably attached to said base mount, wherein the jointed light strip further comprises a pair of jointed circuit boards, a plurality of LEDs disposed thereon, and an electrical connection wire passing through the wire opening of the base mount, wherein said jointed circuit boards being jointed at an angle of more than ninety degrees, forming a rough L shape, and each one of said plurality of LEDs being attached to one or the other circuit board of said pair of jointed circuit boards and wherein the pair of jointed circuit boards of said jointed light strip is further defined by a side portion and a rear portion, said side portion facing a direction generally perpendicular to and away from the motorcycle and said rear portion facing a direction generally behind the motorcycle; and a tubular housing removably attached to said base mount wherein said tubular housing is translucent.

2. The motorcycle shock light of claim 1 wherein the side portion of the pair of jointed circuit boards of said jointed light strip is longer than the rear portion of the pair of jointed circuit boards of said jointed light strip.

3. The motorcycle shock light of claim 2 wherein the LEDs that are attached to the side portion of the pair of jointed circuit boards of said jointed light strip are programmed to become illuminated when the headlight of the motorcycle is turned on and to blink in a grouped sequence when the brakes of the motorcycle are engaged.

4. The motorcycle shock light of claim 2 wherein the LEDs that are attached to the generally rearward facing portion of the pair of jointed circuit boards of said jointed light strip are programmed to become illuminated when the brakes of the motorcycle are engaged.

5. A motorcycle shock light comprising:
a base mount for attaching the shock light to the shock of a motorcycle wherein the base mount is made of plastic and further comprises an open threaded end for accepting a compatibly threaded end of a tubular housing, a closed end, and an adjustable metal strap for attaching to the shock of a motorcycle, said adjustable metal strap of the base mount fitting through a slotted opening of the base mount;

a jointed light strip removably attached to said base mount wherein said jointed light strip further comprises: a pair of jointed circuit boards jointed at an angle of more than ninety degrees and forming a rough L shape and is further defined by a side portion and a rear portion, said side portion facing a direction generally perpendicular to and away from the motorcycle and said rear portion facing a direction generally behind the motorcycle, and a plurality of LEDs disposed thereon; and a plastic tubular housing removably attached to said base mount via reciprocal threaded groves and wherein said tubular housing is translucent.

6. The motorcycle shock light of claim 5 wherein the side portion of the pair of jointed circuit boards of said jointed light strip is longer than the rear portion of the pair of jointed circuit boards of said jointed light strip.

7. The motorcycle shock light of claim 6 wherein the LEDs that are attached to the side portion of the pair of jointed circuit boards of said jointed light strip are programmed to become illuminated when the headlight of the motorcycle is turned on and to blink in a grouped sequence when the brakes of the motorcycle are engaged and wherein the LEDs that are attached to the generally rearward facing portion of the pair of jointed circuit boards of said jointed light strip are programmed to become illuminated when the brakes of the motorcycle are engaged.

8. The motorcycle shock light of claim 7 wherein the LEDs that are attached to the side portion of the pair of jointed circuit boards of said jointed light strip and are programmed to blink in a grouped sequence when the brakes of the motorcycle are engaged turn off and on in such a manner that a group of lights at the top of the device will turn on and then turn off, followed immediately by the next sequential grouping of lights turning on and off, and then the next, with each group of lights turning on and then off in sequence until all side facing lights have cycled through the on and off illumination and if the motorcycle braking ends before the sequence completes, the sequence will continue until the bottom group is briefly illuminated and then the complete side portion of lights will resume constant illumination and if the motorcycle braking continues after the first the sequence has completed itself, then the complete sequence will repeat itself for as long as the motorcycle is braking.

9. The motorcycle shock light of claim 8 further comprising a securing clip removably attached to the tubular housing, said securing clip further comprising a loop portion for attachment to the tubular housing and two arm portions for attaching to a motorcycle shock.

\* \* \* \* \*